United States Patent [19]

Long

[11] Patent Number: 4,915,059
[45] Date of Patent: Apr. 10, 1990

[54] RACEWAY CULTURING OF FISH

[75] Inventor: Clifford W. Long, Olympia, Wash.

[73] Assignee: Fisheries Engineering Research and Development Co., Inc., Olympia, Wash.

[21] Appl. No.: 274,096

[22] Filed: Nov. 22, 1988

Related U.S. Application Data

[63] Continuation-in-part of Ser. No. 48,859, May 12, 1987.

[30] Foreign Application Priority Data

May 11, 1988 [WO] PCT Int'l Appl. ............... PCT/US88/01600

[51] Int. Cl.⁴ ..................... A23L 1/325; A01K 61/00
[52] U.S. Cl. .......................................... 119/3; 426/643
[58] Field of Search ............... 800/1; 119/3; 426/645, 426/643

[56] References Cited

U.S. PATENT DOCUMENTS

| | | | |
|---|---|---|---|
| 3,452,966 | 7/1969 | Smolski | 119/3 |
| 3,678,898 | 7/1972 | Gross | 119/3 |
| 3,842,804 | 10/1974 | Christensen et al. | 119/3 |
| 4,044,720 | 8/1977 | Fast | 119/3 |
| 4,516,528 | 5/1985 | Jones | 119/3 |
| 4,522,727 | 6/1985 | Weber | 210/681 |

Primary Examiner—John E. Tarcza
Attorney, Agent, or Firm—Charles A. McClure

[57] ABSTRACT

Fish are cultured in one or more flumelike watercourses or "raceways" bounded by raceway-defining means. The water flow rate is such that the fish swim substantially continuously to maintain position. The fish are configured too closely to assert territorial rights, as they do when held at lower concentration. Water enters via a well enclosure at the upstream end, as by airlift upwelling; flows through the watercourse, sweeping waste materials along; and departs via a weir-like enclosure at the downstream end, where dissolved or undissolved waste is removed. Water is preferably supplied from and returned to a surrounding natural or man-made body of water, which also preferably floats the physical raceway means, facilitating water depth adjustment. Distribution of fish to adjacent raceways without any netting or handling conducive to injury is accomplished via airlift means. Fish so cultured remain healthy and grow rapidly and uniformly.

16 Claims, 6 Drawing Sheets

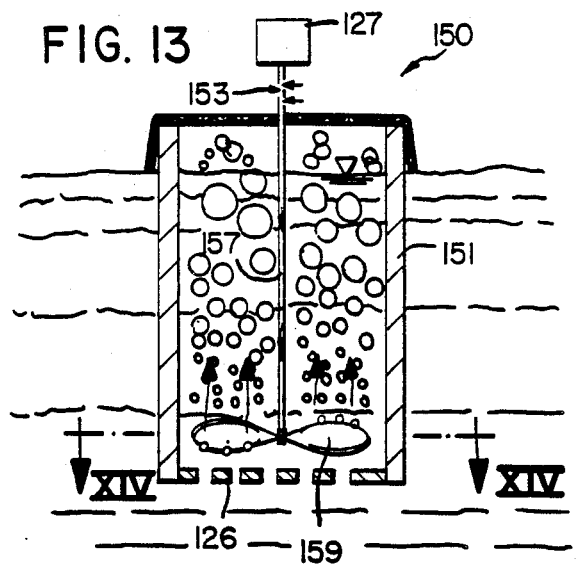
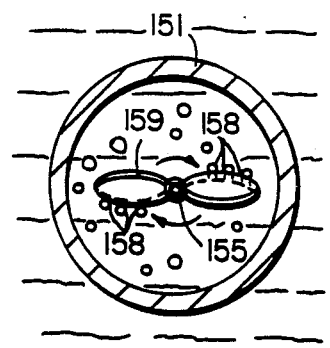
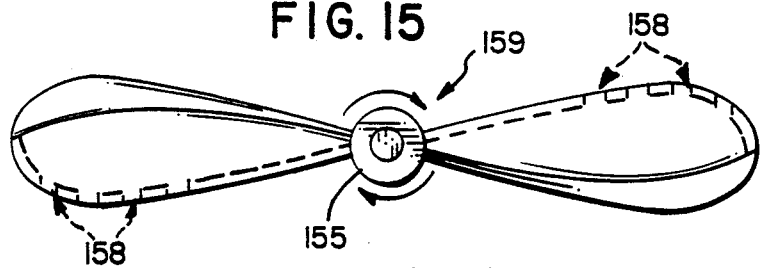
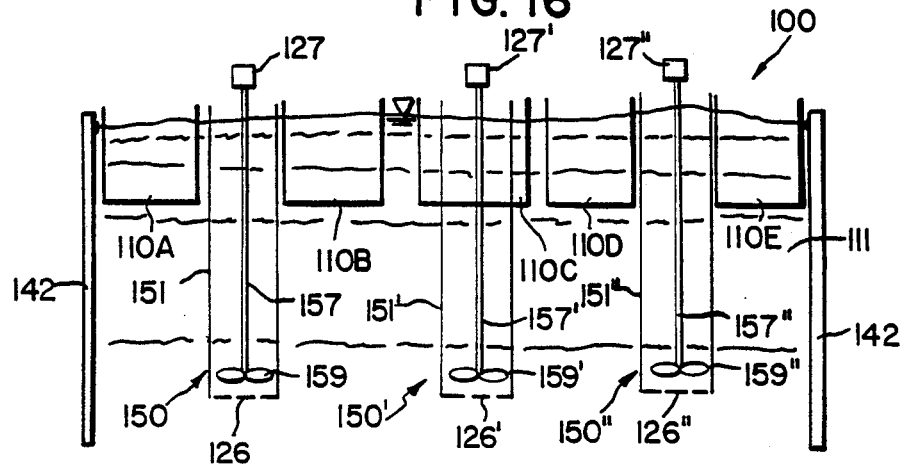

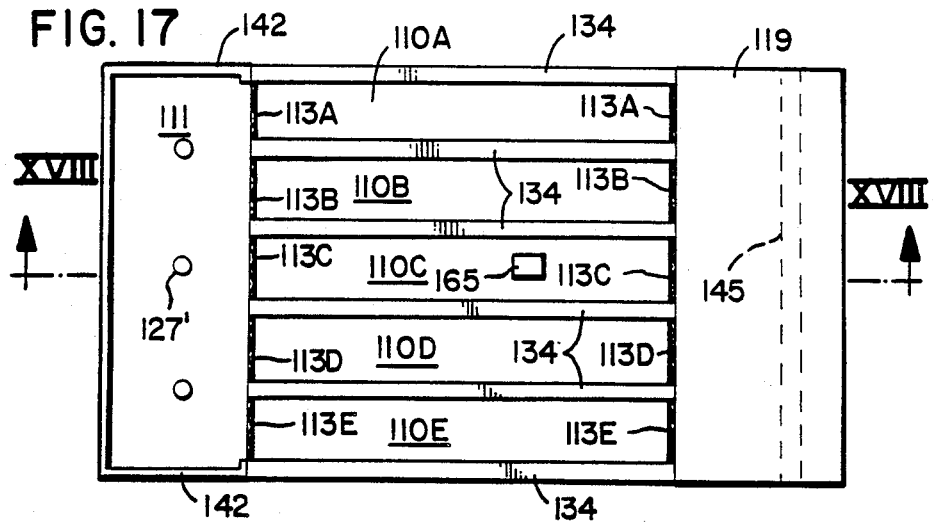
FIG. 17
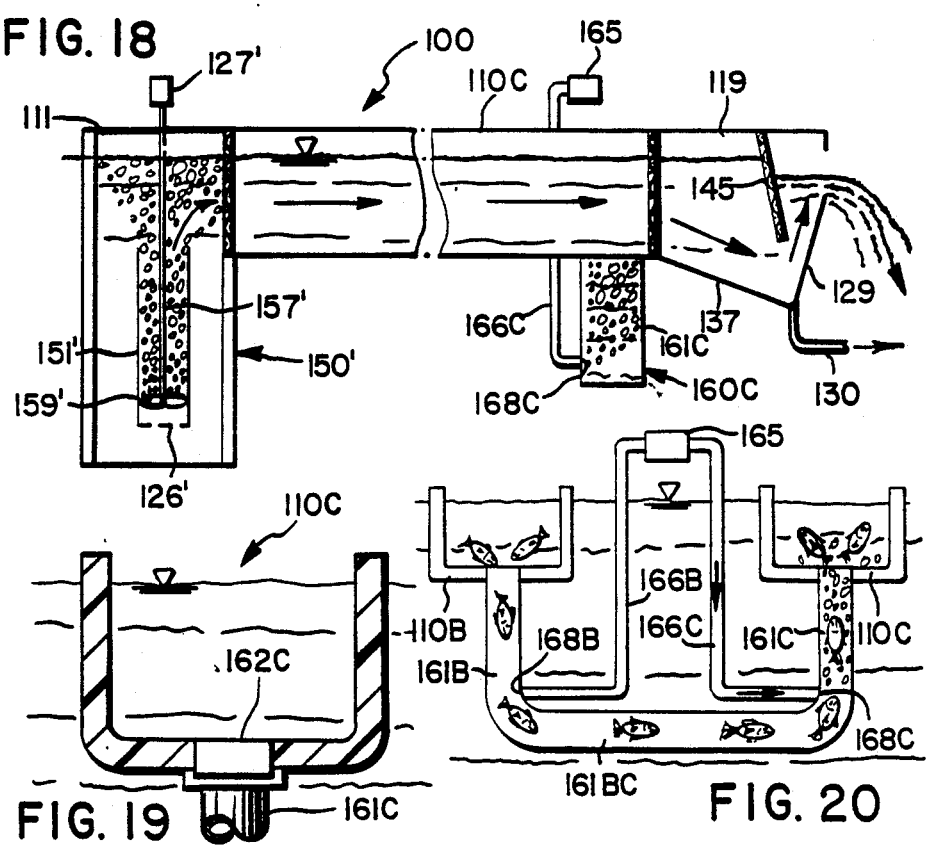
FIG. 18
FIG. 19
FIG. 20

RACEWAY CULTURING OF FISH

This application is a continuation-in-part of my similarly entitled copending patent application, Ser. No. 48,859 filed May 12, 1987, to be abandoned upon the filing of this application.

FIELD OF THE INVENTION

This invention relates to culturing fish swimming closely together in raceways, through which water flows substantially continuously.

BACKGROUND OF THE INVENTION

Fish-raising or "pisciculture" is being widely adopted as an effective way of providing healthful high-protein food of uniform kind and quality. In contrast, fish caught naturally vary greatly in age, size, and quality. Moreover, fishing at large is becoming increasingly expensive and less certain of success, in great part because of past over-fishing and environmental disturbance. Nor can such fishing meet the increasing demand for quantity, quality, and uniformity of product.

Conventional culturing of fish occurs in natural or man-made bodies of water under quasi-natural conditions, susceptible to predation and disease. Somewhat more controlled environments are represented by net-pens, within which fish are confined—but at a necessarily low concentration or density—and hatchery raceways, usually located near a spring or similar source from which water is diverted to flow through such raceways at intermediate speed conducive to somewhat higher fish concentrations or densities.

Maintaining loosely confined fish free of both infection and injury is very difficult. Moreover, although their uniformity is often better than in a conventional catch, such fish continue to compete vigorously for food, whereupon those that have an initial advantage become disproportionately larger, much as in the wild. Net pens, pools, and similar enclosures are well known in the art. Illustrative patents of that general type include U.S. Pat. No. 513,319 to Hoxsie; U.S. Pat. No. 2,944,513 to Keely; U.S. Pat. No. 3,166,043 to Castillo; U.S. Pat. No. 4,394,846 to Roels; Horrex Brit. Pat. No. 1,590,781; and also Nystrom international publication WO 85/08158 of PCT/SE84/00364.

Illustrative fish raceways are shown in U.S. Pat. No. 4,044,720 to Fast; U.S. Pat. No. 4,267,798 to Collins; and U.S. Pat. No. 4,516,528 to Jones, featuring (in the same order) floating and upwelling, geothermal heating, and aeration—each plus waste removal. Raceway processing conditions are disclosed by Ruane et al. in "Characterization and Treatment of Waste Discharged from High-Density Catfish Cultures", in *Water Research*, vol. 11, no. 9, Pergamon Press (1977), pp. 789-800.

Raceway designs are reported by Heard and Martin in "Floating Horizontal and Vertical Raceways Used in Freshwater and Estuarine Culture of Juvenile Salmon", etc., in *Marine Fisheries Review* issue of March 1979, pp. 18-23. Comparisons of net pen and raceway aerobics and fish conditions are made in exhaustive detail by Michel Besner in a 200-page 1980 Ph.D. dissertation (including 20 pp. of citations), University of Washington College of Fisheries, but his experimental results do not seem to have had an appreciable effect upon commercial fish culturing insofar as is known.

There is an increasing need for improving fish culture, and the present invention is directed to meeting that need, in part by extending existing procedures or trends, but also in part by going contrary to accepted principles and practices.

SUMMARY OF THE INVENTION

In general, the objects of this invention are attained by culturing numerous fish in flume-like structures (or "raceways") intercepting the surface of a surrounding body of water, in which the raceway preferably floats. The fish are confined too closely together to assert territorial rights. The rate and volume of flow are so great that the fish must swim to maintain position, as inflowing water is continually replacing the water already in the raceway. Fish excrement, uneaten food, and other contaminants are swept downstream and are removed appropriately. The resulting fish are healthier, larger, more uniform, and better to eat than most fish caught in the wild or raised in net pens have been or could be.

A primary object of the present invention is to improve fish culturing so that more of the food requirements of the world's rapidly increasing population can be readily met.

Another object of this invention is to supplement—not to replace—much of the world's agriculture by aquaculture, namely pisciculture, s required to provide adequate food.

A further object of the invention is to raise healthy, more uniform fish than obtained in previous fish culturing.

Yet another object is to provide apparatus designed to aid in accomplishing the foregoing objects.

A still further object is to attain the foregoing objects more economically than less was accomplished in the prior art.

Other objects of the present invention, together with means and methods for attaining the various objects, will be apparent from the following description and the accompanying diagrams of a preferred embodiment, which is presented by way of example rather than limitation.

SUMMARY OF THE DRAWINGS

For convenience of illustration, the raceway apparatus of this invention is apportioned initially among three successive sheets of drawings of barely overlapping successive upstream and midstream and downstream portions—each shown in several or more views—to illustrate a single raceway. Added sheets illustrate multiple raceway apparatus and other features for use in both individual and multiple raceways.

FIG. 13 is a side sectional elevation of auxiliary means useful in the foregoing individual, or in subsequently multiple, raceway apparatus of this invention;

FIG. 14 is a transverse sectional plan of the apparatus of FIG. 13, taken at XIV—XIV thereon; and FIG. 15 is a plan view of an apparatus component of the two preceding views.

FIG. 16 is a side sectional (bisected lengthwise) elevation of an upstream end portion of a multiple-raceway apparatus embodiment of this invention;

FIG. 17 is a plan view of the apparatus of FIG. 16;

FIG. 18 is a side sectional (bisected lengthwise) elevation of the apparatus, taken at XVIII—XVIII on FIG. 17;

FIG. 19 is a sectional end elevation of a detail of FIG. 18; FIG. 20 is a fragmentary endwise sectional elevation of a plurality of the component raceways of FIGS. 17 to 19.

DETAILED DESCRIPTION OF THE INVENTION

Figure 1:
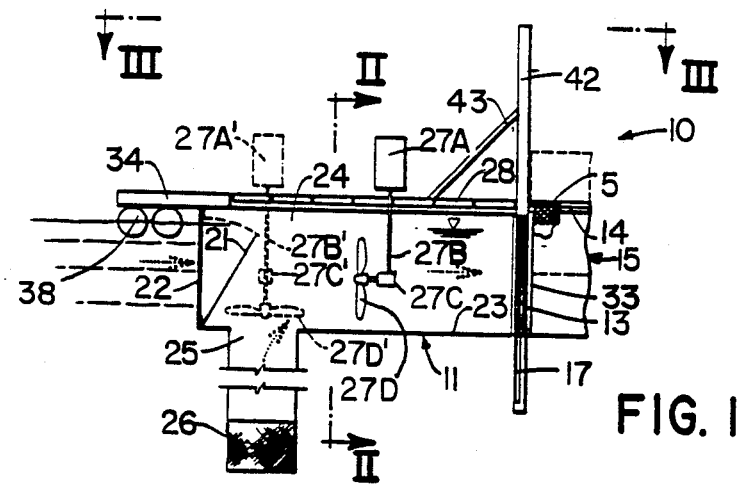
FIG. 1 is a side sectional (bisected lengthwise) elevation of an upstream end portion or well of an individual embodiment of raceway apparatus according to this invention.
Figure 2:
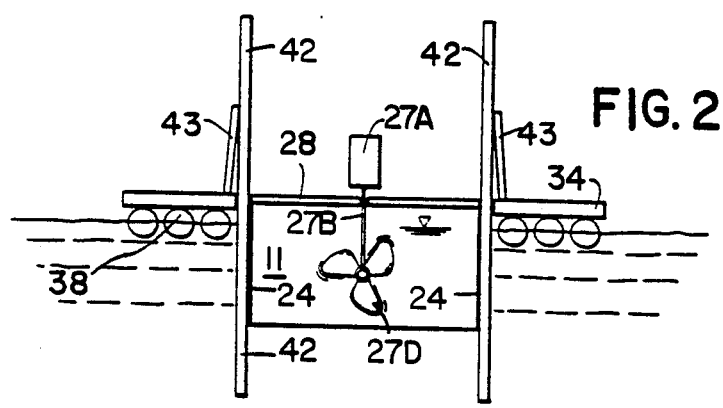
FIG. 2 is a transverse sectional elevation of such apparatus portion, taken at II—II on FIG. 1.
Figure 3:
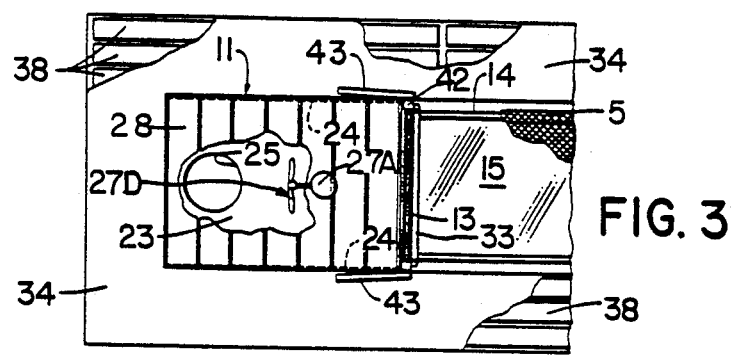
FIG. 3 is a plan of the same taken at III—III on FIG. 1.

FIGS. 1, 2, and 3 show flow introduction pool or well 11, as the upstream portion of individual raceway apparatus embodiment 10 of the present invention, respectively from the side, end, and top, FIGS. 2 and 3 being sectional views, as already indicated. This portion and preferably all of this raceway apparatus is preferably within a surrounding body of water, whose surface the raceway thus intercepts—and whose surface level is denoted occasionally in the various views by a small unnumbered triangle. Midstream portion 15 (the raceway proper) is partly visible at the right in this view, whereas downstream portion 19 is not shown here. The well has sidewalls 24 flanked at their top edges by the upper surface of walkway decking or platform 34, which is supported at each side on cylindrical floats 38 (three shown at each side). The well has at its far upstream end intake door 21 (bottom-pivoted) whose doorway is covered by flat screen 22. Bottom 23 of the well has nearby intake opening 25 with cylindrical inlet screen 26 thereunder.

Supported above such platform by suitable means (not shown) is motor 27A, whose drive shaft 27B passes through an opening in the decking and terminates in gearbox 27C from which propeller 27D is driven by a short intervening shaft. Propeller 27D turns (in a vertical plane) in such a direction as to draw water into the well through screen 22 over the top edge of the pivoted door (if open) and/or up through both cylindrical screen 26 and bottom opening 25. Alternative or supplemental propeller 27D' (shown in broken lines) turns horizontally above cylindrically screened opening 25 and is connected to similarly supported overhead motor 27A' through gearbox 27C' and drive shaft 27B' in like manner. The water drawn into well 11 by either (or both) of such propellers exits therefrom into the open upstream end of the raceway proper, through one or both of removable bar screens 13.

Figure 4:
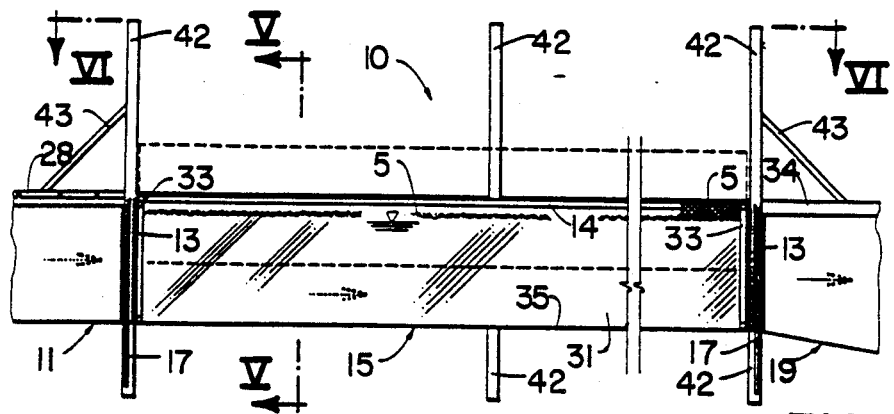
FIG. 4 is a side sectional elevation (overlapping FIG. 1 in minor part) of the midstream portion of such raceway apparatus of this invention.
Figure 6:
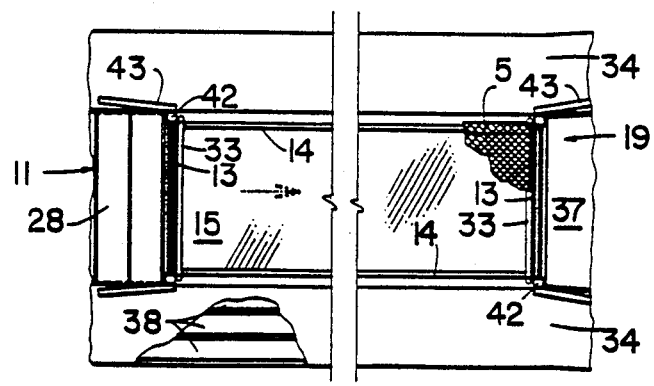
FIG. 6 is a plan of the same, taken at VI—VI on FIG. 4.
Figure 7:
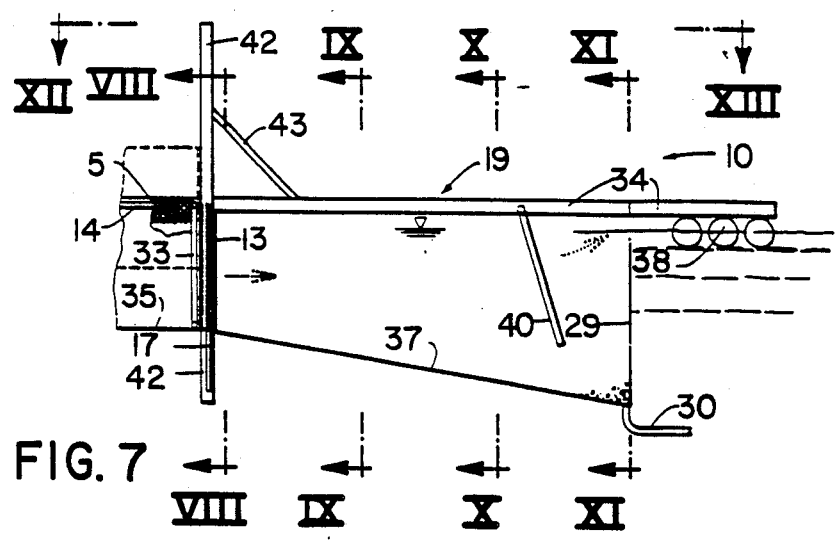
FIG. 7 is a longitudinal sectional elevation of a downstream end portion (overlapping FIG. 4) of the same raceway apparatus of this invention.
Figures 8, 9:
FIGS. 8, 9, 10, and 11 are transverse sectional views of the downstream apparatus of FIG. 7, taken at spaced intervals as so indicated thereon.
Figures 10, 11:
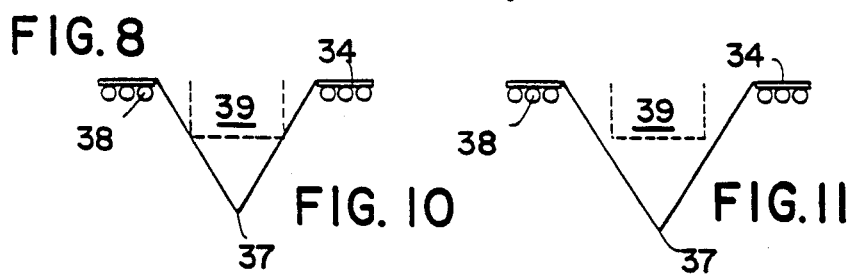

Pair of vertical tracks 42 are supported by platform 34 plus braces 43 at opposite sides between the downstream end of well 11 and adjacent upstream end of raceway 15—together with a like pair of both at the downstream end of the raceway and adjacent upstream end of waste collection lagoon or catch basin 19 (FIGS. 4, 6, 7). The tracks connect to mechanical, electromechanical, hydraulic, or pneumatic lifting apparatus (not shown here) to enable the level of raceway 15 to be changed relative to the prevailing water level, as suggested in broken lines, or perhaps even (not shown) to be raised clear of the water. Sliding panels 17 at each end rise too, to close off well 11 and catch basin 19.

The raceway proper comprises a flexible band of a durable plastic material stretched taut into U-shaped cross-section by attachment to metal frames 33 supported at their edges by vertical tracks 42, which support bar screens 13 at both the upstream and downstream ends. Metal stringers (hidden) fit into sleeves 14 along each upper edge of the raceway material between the frames and support its weight. Removable cover 5 is conveniently in the form of multiple lengths of open-mesh, relatively rigid material shaped like an inverted channel with its side edges extending down along the raceway edges.

Figure 5:
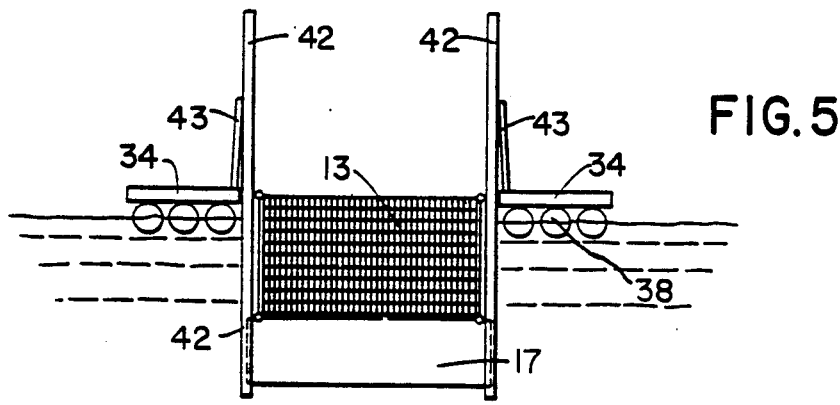
FIG. 5 is a transverse sectional elevation of the midstream apparatus of FIG. 4, taken at V—V thereon.

The raceway has at its opposite ends pairs of upstream and downstream bar screens, as shown in elevation in FIG. 5. One screen in each pair is enough to retain the fish when the other screen in such pair is removed for cleaning or repair. Both the cover and the bar screens have mesh sizes effective to exclude flying and swimming predators from the raceway.

Figure 12:
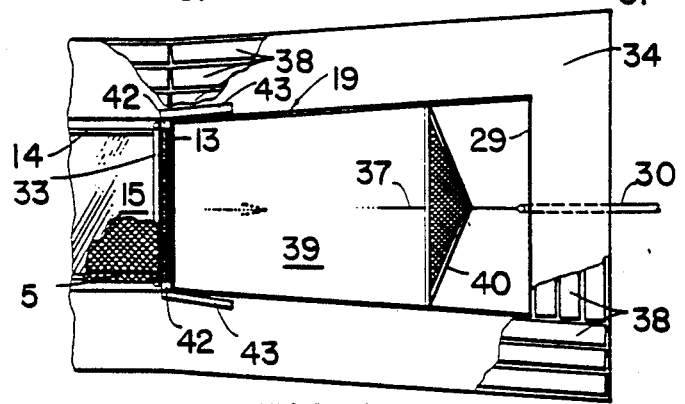
FIG. 12 is a plan of the same downstream apparatus taken at XII—XII on FIG. 7.
Figure 21:
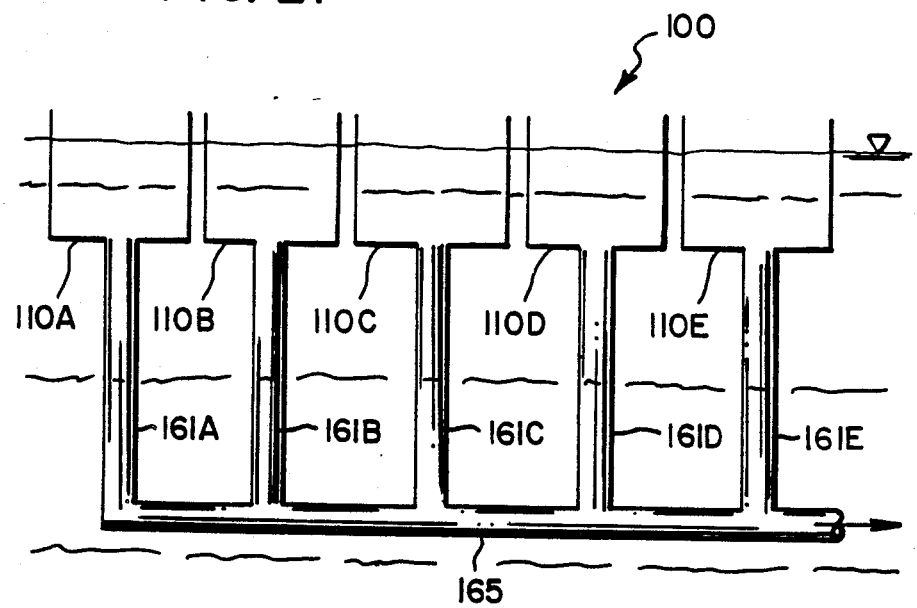
FIG. 21 is a schematic representation of connection of raceways as shown fragmentarily in FIG. 20.

FIG. 7 shows, in longitudinal section, and FIG. 12 shows in plan, flexible waste collection lagoon or catch basin 19 through which the water from the raceway exits over weirlike downstream end 29. Intermediate FIGS. 8, 9, 10, and 11 are successive transverse sections of the catch basin viewed in the upstream direction. The rectangular U-shaped section shown at the entering end in FIG. 8 transitions gradually to a concave (upward) outline in FIG. 9, then into a V-shaped one in FIG. 10, and finally into a larger V-shape in FIG. 11.

The enlarging cross-section of the catch-basin increases the volume and thereby slows the water flow rate, ensuring settling out of most undissolved solid wastes. The bottom edge 37 angles downward to a lowest point, at which waste outlet line 30 (cut away in FIG. 7) connects thereto to convey such waste onshore or to an otherwise remote collection station or other suitable destination. Filter 40, which is suspended removably from the platform near the top of the end wall, collects ammonia and perhaps other dissolved or free gaseous contaminants and is readily removable for renewal and replacement or regeneration.

FIG. 13 shows in sectional elevation air-lift apparatus 150, suitable for use in well 11 (along with or instead of the apparatus of FIGS. 1 to 3). This view features open-top cylindrical intake housing 151 having screened inlet end 126 at its bottom. Hollow shaft 157 from motor 127, mounted by suitable means (not shown) above the water level, has at its bottom end screw propeller 159. Just beneath the motor this shaft has air-inlet openings 153 into which arrows point to suggest the inflow of air thereinto. The trailing edges of the propeller have openings 158 therein, from which bubbles are rising. Indeed, the water in the interior of housing 151 is filled with air bubbles from the propeller all of the way to the top, where it overflows into the raceway itself.

Apparatus in foregoing FIG. 13 and/or in the subsequent views is designated, to the extent it is similar to apparatus already shown and described, by reference numerals higher by one hundred (sometimes with a suffix) for such corresponding components, while dissimilar components are marked with other three-digit numbers in the one hundred series.

FIG. 14 is an enlarged sectional plan through the junction of hollow propeller 159 with hub 155 at the bottom of a hollow shaft (157, not visible here) whose rotational (clock-wise) direction is indicated by arrows. This view shows outlet openings 158 along the propeller's trailing edges—with exemplary bubbles.

FIG. 15 is a further enlarged view of propeller 159, and its supporting hub 155 at the bottom end of the shaft, also outlet openings 158 in the trailing edges.

FIG. 16 shows, rather schematically (predominantly in transverse or endwise sectional elevation), multiple-raceway embodiment 100 of the present invention, including air-lift system 127 of the several preceding diagrams just described and a couple additional air-lift systems transversely of well portion 111 bounded by sidewalls 142 at both left and right. Shown are five raceways: 110A, 110B, 110C, 110D, 110E—seen only end-on and without screens, supports, etc. Walkways 134 flank the first and last raceways and intervene between each pair of adjacent raceways. Visible above the water level are three airlift motors, 127, 127', 127''—with respective drive shafts 157, 157', 157'' extending down to screw propellers 159, 159', 159'' within cylindrical housings 151, 151', 151'' of respective air-lift units 150, 150', 150''.

FIG. 17 shows rather schematically, in plan, such multiple raceway embodiment 100, featuring well portion 111 at the left and collection lagoon or catch-basin portion 119 at the right, joined by raceways 110A, 110B, 110C, 110D, and 110E, but with pairs of screens 113A, 113B, 113C, 113D, 113E at the left between the well and the respective raceways, and at the right between respective raceways and the catch basins.

FIG. 18 shows same raceway apparatus 100 in a longitudinal medial section, featuring well 111 with air-lift system 150' at the left, collection lagoon 119 at the right, and central raceway 110C (partly cut away to conserve space) in between. Features of lagoon or catch-basin 119 in FIG. 18 are denoted by reference numerals one hundred higher than those of lagoon 19 previously shown—and are not necessarily mentioned here. Joined to the under side of raceway 110C, just to the left of its junction with collection lagoon 119, is air-lift system 160C, which differs from the 150 type of such system simply by replacing the submerged propeller (plus shaft and motor) with a side inlet from compressed air line 166C. Air flow is furnished by motor-driven compressor 165 supported on one of the walkways (see FIG. 17) above the water surface.

FIG. 19 is a detail transverse view of cover 162C over the top end of housing 161C where it joins raceway 110C. The cover may be removed manually or may be provided with suitable mechanical lifting or other opening means (not shown) when desired to connect the raceway interior with the housing interior.

FIG. 20 shows in transverse sectional elevation raceway 110C, whose air-lift housing 161C is filled with air bubbles, joined to like air-lift housing 161B (bubble-less) of raceway 110B by transverse header 165 of similar cross-section. Fish in raceway 110B are entering housing 161B and proceeding down into and through the header into the bottom of housing 161C and up through it out into raceway 110B. The light weight of the air-in-water mixture induces flow of water through the header from the dense all-water contents of housing 161B (which is not receiving compressed air). Both covers 162B and 162C are shown lifted up to enable the water to flow, and the fish to go readily with the flow, out of raceway 110B and into raceway 110C. The flow dissuades the fish from entering the non-moving contents of such housings not opened at the top or elsewhere in the header. At the right of the raceway assembly the header continues to the right as indicated by the arrow, such as to a location on shore or elsewhere, where water may be removed, whether by air-lift or pump means for harvesting or otherwise gathering the fish.

The apparatus of this invention does not require any exotic materials or methods of construction, or any more than ordinary skill for persons in the construction trades to select suitable materials and form them into the variously designated shapes. A flexible polymeric material is preferred for the raceway walls and bottom, as such a material with a smooth surface protects the fish from abrasion. A good choice is polyester-reinforced chlorinated polyethylene, about a millimeter thick. The generally rectangular end-frames to form it into a U-shaped outline are made of light-weight metal, such as aluminum, as are the stringers that fit into the lengthwise edge sleeves in the raceway material and support it. Either material is also usable for the lagoon.

The bar screens at the ends of the raceway preferably are made up of round vertical metal rods or tubes several millimeters in diameter and suitably spaced to retain the fish to be confined therein, plus somewhat heavier horizontal cross or reinforcing members. Placing a pair of such bar screens at each end of the raceway proper enables a screen to be removed for cleaning, etc. The mesh size of the intake screens for the well is smaller, in order to exclude small fish and undesirable animals or plants that also may be present in the surrounding water. Preferred screen materials include stainless steel and thermosetting plastics.

The electrical equipment is also conventional and runs on A.C. power from any available source, such as a public utility, which may be supplemented by a backup generator on site driven by an internal-combustion engine fueled by gasoline, diesel fuel, etc. The drive motors may be A.C.-powered, or they may operate from rectified D.C. with battery backup. Multiple motors and backup facilities are desirable to permit removal of a unit for repair or maintenance without interruption of operations and because the fish could not survive long in the event of substantial interruption of raceway water flow.

The mesh cover may be opened to introduce the fish from overhead. The fish may be fed through the mesh with the cover open or closed. The cover composition resists not only the elements but also attempts by predatory birds or other animals to harm or take the fish. Metal is a good choice, but lighter polymeric plastic or textile meshes, preferably with added core wire, can be substituted for all-metal meshes.

The raceway apparatus itself is preferably located in a body of water, such as a lake or an estuary, from which water is readily drawn and into which it is easily discharged. The raceway proper is conveniently from about a meter to several meters wide, about one to two meters deep, and about ten to a dozen meters long, though greater lengths may be more desirable in some applications. The walls of the raceway intercept the surface of the water at such a level as to provide the needed water volume for fish confined in the raceway, and are adjustable for depth as already desired. Alternatively, such adjustment of the depth may be provided by rolling the raceway walls up and around the lengthwise supports (stringers) and maintaining a sufficient side seal to contain the fish, as by detaching the ends of the raceway proper from the U-frames and substituting brushes on the frames to engage the ends and thereby contain the fish.

The outlet filter for adsorbing gaseous contaminants may be a modified gabion containing natural or artificial zeolite or like material, so as to capture ammonia, usually dissolved in ionic form. A preferred material comprises the mineral clinoptilolite, which can be regenerated very economically with salt water. See, for example, an article by Bruin, Nightingale and Mumaw, entitled "Bio-Engineering for Fish Culture" in *Seattle Aquarium Technical Report* no. 7 (1981) at p. 92.

Operation of the apparatus of this invention will be readily apparent from the foregoing description and drawings. The fish are raised or "grown out" from fingerling size, until they reach a suitable size for marketing. Their food requirements also increase over such period and are readily met by an increase in duration or in frequency of feeding, with a net increase in quantity of feed, which itself may be of conventional or innovative type.

The described motor(s) normally drive(s) the propeller(s) to upwell the underlying water, whether directly or by air-lift, enough to flow the water through the raceway at desired velocity. Upwelled water flows through the first pair of vertical screens and into the raceway proper, through the raceway, and out through the second pair of such screens, into the catch basin, mostly through the suspended filter, and finally over the basin's weirlike end out into the surrounding body of water. At high flow rates the filter pivots to allow water to escape around or under it, if and as preferable. Many other filter arrangements could be substituted to attain the same objectives.

The water flow rate should be such as to induce the fish to swim substantially continuously. In general a suitable flow rate is at least several meters per minute. More particularly, taking into account the varying sizes of fish throughout the portion of their life cycle profitably spent in a raceway, the flow rate should be at least about one fish length per second and at most about two fish lengths per second, preferably about one and one-half fish lengths per second. Such flow rates are adequate to convey substantially all solid waste, such as excrement or uneaten food, into the catch-basin or collection lagoon for ready removal, as well as to accomplish other objectives of this culturing method.

Total water flow should be sufficient to replace the raceway water frequently enough to maintain a healthful concentration of oxygen—as well as to assure waste collection for removal. In general, the flow should be such as to bring about a complete wetted volume turnover not less than once every ten minutes and preferably at least about once every several minutes. Because a substantial part of the wetted volume is occupied by fish rather than by water, such flow assures complete water turnover at least about a half dozen to about one and a half dozen times per hour.

As the fish grow larger, their increased oxygen demand is preferably met by increasing the water flow rate, as already noted, and may also be met in part by increasing the water depth—which also enables the concentration or density of fish to be maintained as desired. Filters for ammonia as already described for use at the outlet end of a raceway may be suspended likewise at spaced intervals to cope with increased fish size and waste output.

Conventional net pens for fish culture rely upon tidal or other low flow rate or diffusion of water to supply oxygen to the fish and to disperse waste materials, resulting in an unacceptable incidence of disease in the fish and degradation of the environment, which cannot renew itself satisfactorily even at low fish densities customary in such enclosures. A fish concentration or density from about ten to a dozen kilograms per cubic meter or grams per liter (say, ¾ pound per cubic foot) of fish is a common net pen level.

Standard hatchery raceways may be an order of magnitude higher than net pens in fish concentration or density, say from somewhat under a hundred to somewhat over a hundred kilograms per cubic meter, and even though their water flow rate may be increased similarly, their flow rate may approximate only about a centimeter per second (about several hundredths foot per second), and their water volume exchange or turnover time usually about a half hour or so. Hence, they similarly fail to approach operating conditions considered to be most satisfactory in the experience of the present invention.

According to this invention, preferred raceway fish density, given adequate water flow rate and turnover, is at least about two hundred, preferably about several hundred, kilograms per cubic meter. As noted, the desired density can be maintained readily by lowering the raceway proper relative to a floating supporting structure or by raising or rolling up the raceway proper relative to the water surface however determined.

Conventional wisdom in the culturing of fish holds that the higher the density of the fish, in whatever enclosure, the lower the rate of growth, the food conversion ratio, and survival rate. However, at low densities the more vigorous fish exercise their territorial rights and commandeer more of the available food than their less fortunate neighbors, resulting in non-uniformity and necessitating periodic sorting or grading—and increasing the likelihood of disease and injury from excessive handling.

The present invention contradicts conventional practice by subjecting fish at high density in a raceway to high water flow rates and high frequency of water replacement or turnover. The fish have to swim vigorously to maintain their position, thereby improving their musculature, foregoing contesting injuriously for territory or food, and developing more uniformly than otherwise. The environmental loading drops significantly below that of net pens and hatchery raceways by reason of waste collection and removal, enabling water to be returned to the environment and be re-used subsequently.

The methods and apparatus of the present invention are useful with a wide range of fish, such as varieties of salmon (such as atlantic, coho, and sockeye) and trout (such as brown and rainbow). Whereas generally salmon prefer colder temperatures, rainbow trout can be raised in water at more moderate but still cool temperature.

Although other methods of providing the necessary water may be used, the method of choice at this time is induced upwelling, both for its economy and for the localized control it affords over the resulting temperature of water to which the fish are exposed. It can tap cooler stratified layers than are normally present near the surface, even in lakes limited to a about half dozen meters or so in depth. Of course, deeper estuarial waters often have an even more sharply defined thermocline to be drawn upon in this manner. Such control of temperature enables warm-water fish and even other types of marine animals to be raised or "grown out" likewise.

Air-lift provision of water for the head-end of raceways according to this invention has an added advantage over screw propulsion without air-lift in enabling smaller propellers to be used at even lower speeds, thereby reducing electric power requirements and costs. Injection air-lift in transferral of fish from one raceway to another or to a harvesting location is superior to prior art methods because the fish essentially swim from one place to the other without interposition of net or human hands or other handling device, minimizing injury.

Raceway apparatus for use according to this invention preferably floats in the surrounding body of water, thereby eliminating or minimizing the need for anchoring. Adjustable supports, such as the illustrated tracks between raceways and their flotation means, or the suggested roll-up means for the flexible raceway material, are helpful in enabling the depth of water in the raceway to be decreased, as when adding or harvesting fish, or to be increased, as when the growing fish require more volume.

This invention facilitates life-cycle culturing of fish from fingerling size to marketing size in a single facility. Thus, a batch of fingerlings of appropriate quantity and type is placed in a raceway appropriately adjusted in depth so that its volume confines the fish to the desired density. As the fish grow, the raceway depth is increased gradually, to increase the volume of water in the raceway and thereby to maintain or adjust the desired fish density. When the volume is at or near the maximum available in the raceway, some of the fish (e.g., half of them in number) are transferred from that initial raceway to another raceway, and both raceways are adjusted in depth to continue the desired fish density. Alternatively, the initial raceway may be wholly emptied of fish into two or more other raceways similarly adjusted, and a batch of fingerlings introduced into the initial raceway as before.

As time goes on for at least several months and preferably for at least one growing season, and the fish get increasingly larger, the number of raceways to accommodate them most conveniently tends to increase also, necessitating transfers of at least some of the fish to one or more additional raceways. Because the fish swim readily from one raceway to another suitably interconnected to it, as via the illustrated air-lift method and apparatus, the transfer process is not detrimental to their health. The water flow rate and volume are adjusted to suit whatever fish are in a given raceway at a given time.

It will be apparent that this invention provides a fish "factory" wherein fish can be produced in whatever marketable size is desired. Properly controlled conditions result in low injury and mortality rates, high quality and uniform size of product, hence a high economic yield (i.e., high profits). The restaurant marketplace is most receptive to such a food product, so such pisciculture will expand into an industry of gigantic size. With appropriate temperature control of the water, as detailed above, additional types of fish and other types of marine creatures can be cultured similarly.

Despite presentation of preferred apparatus embodiments of the invention, additional variants in both structure and use have been suggested above. Other modifications may be made, as by adding, combining, subdividing, or deleting parts or steps, while retaining at least some of the numerous advantages and benefits of this same invention—which itself is defined in the following claims.

I claim:

1. Pisciculture process comprising the steps of
confining numerous substantially uniformly sized fish within a flumelike watercourse so closely as to preclude them from exercising territorial rights "to yield substantially uniformly sized fish", and
flowing water therethrough from end to end at a rate of at least about one and not more than about two fish lengths per second,
requiring and enabling the fish to swim substantially continuously to maintain position.

2. Pisciculture process according to claim 1,
including controlling the density of fish per wetted volume of watercourse by adjusting the depth thereof at substantially unchanging surface elevation as the fish grow.

3. Pisciculture process according to claim 1, including
maintaining a density of fish in the watercourse of at least about two hundred kilograms per cubic meter of such volume.

4. Pisciculture process according to claim 1,
including flowing water into the watercourse
in an amount corresponding to about a half dozen to one and a half dozen turnovers of the water therein per hour.

5. Pisciculture process comprising the steps of confining numerous fish, all substantially uniformly sized,
within a flumelike watercourse at a density of several hundred kilograms of fish per cubic meter of watercourse wetted volume, and
flowing water therethrough at a rate of about 1½ fish lengths per second.

6. Pisciculture process according to claim 5, including
slowing the water flow near the downstream end of such a watercourse and thereby settling out undissolved solid wastes,
by progressively increasing its widthwise cross-section at the approach to such end.

7. Pisciculture according to claim 6, including
removing from the downstream end of the watercourse solid wastes accumulating therein from fish feeding and excretion,
and returning the water, less such removed waste, to the adjacent body of water from which it was taken originally.

8. Pisciculture process comprising the steps of locating within an underlying and laterally surrounding body of water an artificial watercourse having an upstream end, a downstream end, and a flow passageway interconnecting the two ends, and up welling water into the upstream end of the watercourse from such underlying and laterally surrounding body of water by injecting air into a column of water underlying the watercourse, interconnecting a plurality of watercourses in a given vicinity laterally below the water surface intermediate their end, and hydrodynamically transferring fish from one to another of such watercourses via such interconnection, including causing water to flow in the direction of transfer, and thereby inducing the fish to exit one watercourse and to enter the other watercourse as desired without necessity of being gripped, netted, or otherwise handled.

9. Pisciculture process according to claim 8, wherein the plurality of watercourses are so interconnected via underlying water columns connected overhead to the respective watercourses and cross-connected below to each other.

10. Pisciculture process according to claim 9, including injecting air within the column of water underlying the watercourse to be entered by fish exiting first the second watercourse, and thereby causing water flow in the desired direction.

11. Pisciculture process according to claim 9, including harvesting the fish by interconnecting such a column of water underlying such a watercourse to a passageway leading therefrom to a harvesting location and inducing flow thereto.

12. Pisciculture process comprising the steps of confining fish of like kind and size in a watercourse at a density of at least about two hundred and at most three hundred kilograms per cubic meter, passing water through the watercourse at a rate requiring and enabling the fish to swim substantially continuously, and harvesting the fish at substantially uniform size after growth thereof under such conditions for a substantially continuous period of at least several months.

13. Pisciculture process according to claim 12, wherein the growing fish are maintained at substantially constant density including lowering the bottom of the watercourse below the surface level.

14. Pisciculture process according to claim 12, wherein the fish as they grow larger are transferred from one such watercourse to an adjacent such watercourse including interconnecting the respective watercourses laterally and vertically underneath and providing airlift of water into the destination watercourse while substantially maintaining continuous flow in the respective watercourses.

15. Pisciculture process according to claim 2, wherein the fish are introduced as fingerlings and including a period comprising a growing season sufficient to bring such fish to harvesting size.

16. Pisciculture process according to claim 12, wherein the fish are cold-water fish from the classes of salmon and trout, and including harvesting such fish at substantially uniform size.

* * * * *